United States Patent
Dupraz et al.

(10) Patent No.: US 6,168,273 B1
(45) Date of Patent: Jan. 2, 2001

(54) APPARATUS FOR MAGNETIC SECURING A SPECTACLE FRAME TO A SUPPORT

(75) Inventors: Jean-Francois Dupraz, Veyziat; Jean-Luc Dupraz, Saint-Claude, both of (FR)

(73) Assignee: Etablissements Rochaix Neyron, Arbent (FR)

( * ) Notice: Under 35 U.S.C. 154(b), the term of this patent shall be extended for 0 days.

(21) Appl. No.: 09/403,454

(22) PCT Filed: Apr. 20, 1998

(86) PCT No.: PCT/FR98/00793

§ 371 Date: Oct. 21, 1999

§ 102(e) Date: Oct. 21, 1999

(87) PCT Pub. No.: WO98/48316

PCT Pub. Date: Oct. 29, 1998

(30) Foreign Application Priority Data

Apr. 21, 1997 (FR) .................................. 97 05043

(51) Int. Cl.[7] ....................................... G02C 1/00
(52) U.S. Cl. ........................ 351/158; 351/112; 248/902
(58) Field of Search .................... 351/111, 112, 351/158; 248/309.1, 902

(56) References Cited

U.S. PATENT DOCUMENTS

| 1,164,697 | * | 12/1915 | Alsop | 351/112 |
| 5,278,591 | * | 1/1994 | Trotter | 351/112 |
| 5,366,070 | | 11/1994 | Wolov | 206/214 |
| 5,568,207 | | 10/1996 | Chao | 351/57 |

FOREIGN PATENT DOCUMENTS

| 4 316 698 | 11/1994 | (DE) . |
| 0 615 041 | 9/1994 | (EP) . |
| 0 743 545 | 11/1996 | (EP) . |
| 2 170 030 | 7/1986 | (GB) . |

OTHER PUBLICATIONS

Patent Abstracts of Japan; vol. 096, No. 011, Jan. 31, 1996 and Japanese Patent 07 244260, Miyoshi, Sep. 19, 1995.

* cited by examiner

*Primary Examiner*—Huy Mai
(74) *Attorney, Agent, or Firm*—Harrison & Egbert

(57) ABSTRACT

A spectacle frame which has two sides each of which includes a stud connected thereto by a hinge. The spectacle frame has a magnetic element which allows the spectacle frame to be fixed on a support. This magnetic element has at least one magnet connected to at least one of the two sides of the spectacle frame. The magnet can be either molded into the frame or affixed within a hole in at least one of the sides.

7 Claims, 1 Drawing Sheet

APPARATUS FOR MAGNETIC SECURING A SPECTACLE FRAME TO A SUPPORT

TECHNICAL FIELD

This invention relates to a spectacle frame.

BACKGROUND ART

It is understood that many spectacles, whether optical glasses worn on a daily basis or sun glasses, are already known. Now, when someone wears spectacles, it sometimes happens that he has to temporarily take them off, while he nevertheless wishes to keep them within hand reach.

At that occasion, one will often have a tendency to put the spectacles in the bottom of a pocket. Besides the fact that it is possible to find in the latter objects that are likely to damage the lenses of the spectacles, it sometimes proves uneasy to withdraw them. Such an operation may furthermore prove particularly difficult, e.g. when practising sports that require wearing gloves, such as ski or cycling. In addition, while doing so, it often occurs that some movements, even the mere fact of bowing down, cause these spectacles to accidentally and involuntarily slide out off the pocket. The spectacles then fall onto the floor, which often results in damaging them or, when the fall is not noticed immediately, in merely losing them.

It is obvious that, in all the preceding cases, it is assumed that the person wearing the spectacles has also put on a garment provided with an easily accessible pocket, which is not always the case, especially in the case of sportswear.

Another solution then consists in providing the frame with a string each end of which is connected to one side of the spectacles. Thus, when they are no longer needed, it is possible to take off one's spectacles, which remain hanging at one's neck, being retained by the string. Though this solution is widely spread, it is however no ideal one, since it is possible for the string to pass over one's head and for the spectacles to thus drop onto the floor. In addition, a connection between the string and a side of the spectacles is in most cases brought about by means of a running-type knot the grip of which has, in the course of time, a tendency to loosen, with the consequences one can imagine.

From the Japanese document JP-07 244260 it is known a spectacle frame capable of being fixed to a metallic support. Such a frame includes, on the front face, fixing means of a magnetic kind that are in the shape of one or several protrusions, either inserted against the frame or moulded during the manufacturing of the latter. These protrusions are provided with an end of a magnetic kind capable of entering into contact with a metallic support, in order to ensure the fixing of the spectacle frame on the latter. One should note that these magnetic ends are arranged in a plane substantially arranged at the front side of the curvature of the lenses, so that the latter are protected only when the spectacle frame is fixed on a metallic support providing a strictly planar surface, which is seldom the case.

SUMMARY OF THE INVENTION

Therefore, the present invention overcomes the aforementioned drawbacks, this by means of a spectacle frame capable of being fixed, in particularly temporarily, on a receiving support that may be of a largely varying nature, such as a garment, a dashboard of a vehicle, a frame of a bicycle, etc. This device is of a relatively easy design and particularly efficient in use.

To this end, the invention relates to a spectacle frame characterized in that it is provided with means of a magnetic kind for the fixing on a support.

According to a first embodiment, the fixing means of a magnetic kind includes at least one magnet associated to the spectacle frame. This advantageously allows to fix the spectacles on any kind of ferrous support.

The invention also relates to bases for receiving such a spectacle frame, which bases are aimed at being inserted against any support, such as a garment, the frame of a bicycle, etc., such a base therefore including adequate means for the fastening to this support.

Finally, the magnetic fixing means can be in the shape of a combination, on the one hand, of a spectacle frame at least one of the components of which is made of a magnetic or non-magnetic ferrous metallic material or includes a part made of such a material and, on the other hand, of a magnetic base including adequate means for the fastening to a support.

The invention also relates, independently, to such magnetic bases for receiving spectacle frames.

The advantages resulting from the present invention reside in that it is possible to take off one's spectacles, in order to quickly, efficiently and strongly fix them temporarily on a support of a ferrous kind, such as a frame of a bicycle, or on a base made integral, through adequate means, with any support, such as a dashboard of a vehicle, a bicycle, a garment or the like.

One should note that the fixing means of a magnetic kind are so designed as to allow a particularly efficient connection between any support and the spectacle frame, so that the risks of sliding and falling on the ground, with the consequences this involves, are particularly reduced.

Further aims and advantages of the present invention will become clear during the following description that relates to an embodiment that is given only by way of an indicative and non-limiting example.

BRIEF DESCRIPTION OF THE DRAWINGS

This description will be better understood with reference to the attached drawing, in which.

DETAILED DESCRIPTION OF THE INVENTION

As shown in FIGS. 1 to 4 of the attached drawing, the present invention relates to the field of the spectacle frames 1.

Figure 1:
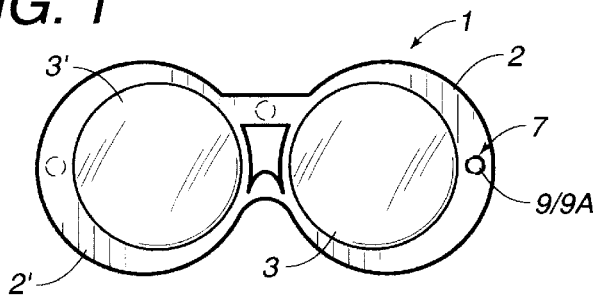
FIG. 1 is a schematic and elevational view of a first embodiment of a spectacle frame according to the invention.

Thus, such a spectacle frame 1 is in the shape of two frames 2, 2' into which corrective lenses 3, 3' are set, as shown in FIG. 1. According to another embodiment, which more frequently occurs and is shown in FIGS. 2 to 4, such a spectacle frame 1 may include, on both sides of the frames 2, 2', a stud 4 to which a side 6 of the spectacles is connected through hinging means 5.

According to the invention, this spectacle frame 1 is provided with means 7 of a magnetic kind for the fixing on a support 8.

According to a first embodiment, these fixing means 7 have at least one magnet 9 associated to the spectacle frame 1 and advantageously authorizing its fixing on any support 8 of a ferrous metal kind.

Figure 2:
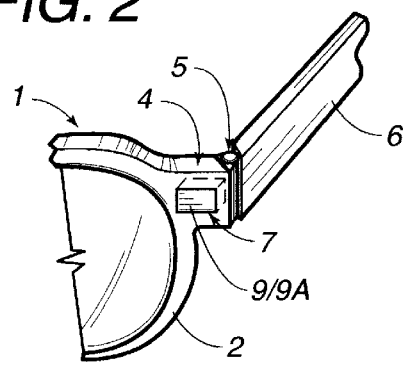
FIG. 2 is a schematic, partial and perspective view of a spectacle frame including a magnet or a metal part integrated into the stud.
Figure 3:
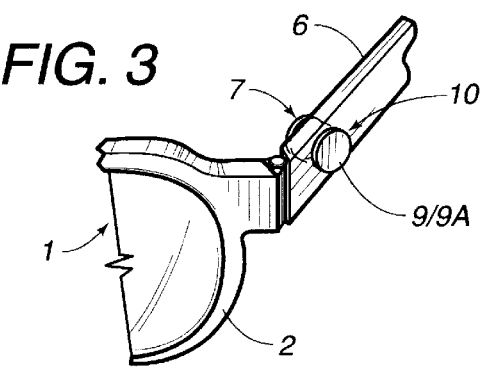
FIG. 3 is a view similar to the foregoing one, corresponding to an embodiment in which the magnet or the metal part is integral with a side of the spectacles.
Figure 4:
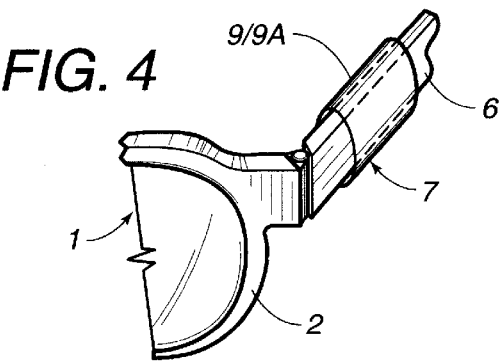
FIG. 4 is a view similar to the foregoing one, corresponding to another embodiment.

One notes that such a magnet 9, in the shape of a magnetized disc, can be associated to at least one of the frames 2, 2' and/or to at least one of the studs 4 and/or to at least one of the sides 6 of the spectacle frame 1, as shown in FIGS. 1 to 3, respectively.

Such an association is brought about, as shown in FIG. 1, by integrating the magnet 9 into the spectacle frame 1, such as during the operation of moulding of the latter. This magnet 9 can also be inserted against the spectacle frame 1 by adequate means, such as, through gluing, screwing, crimping or the like, as shown in FIG. 2. In addition, it can be forced into a hole 10, such as a through-hole or a blind hole, provided for in any of the components of the spectacle frame 1, such as in the side 6, as can be seen in FIG. 3.

Finally, this magnet 9 can also be arranged, such as through crimping, around the side 6, as shown in FIG. 4, or around the stud 4. Such an embodiment will find a particularly well adapted application within the framework of a spectacle frame 1 of a metallic kind.

As stated above, the fixing means 7 corresponding to this first embodiment are in the shape of a magnet 9 and therefore allow to fix the frame 1 directly on a support 8 of a metallic and ferrous kind.

When this support 8 is not of a ferrous kind, but is made of any material whatsoever, such as a textile material as that of a garment, a bicycle frame of aluminium or the like, a dashboard of a car, etc., the fixing means 7 are advantageously completed by a base 11 being e.g. in the shape of a plate 12 of a magnetic or non-magnetic ferrous metal kind including adequate fastening means 13 allowing it to be inserted against the support 8.

According to another embodiment of the invention, the fixing means 7 may be in the shape of a combination of two elements, such as shown in FIGS. 5 to 8, which will more in particular be referred to in the following description.

The first element of this combination is, according to a first embodiment, a spectacle frame 1 at least one component of which, viz, at least one of the frames 2, 2', and/or at least one of the sides 6, is made of a magnetic or non-magnetic ferrous metallic material. According to another embodiment, this first element is in the form of a metal part 9A of a magnetic or non-magnetic ferrous kind associated to the spectacle frame 1.

According to a preferred embodiment, such a metal part 9A may be associated to the spectacle frame 1 in a way similar to a magnet 9, as described above.

Thus, this metal part 9A can be integrated, as an insert, into the spectacle frame 1. It can also be inserted, by various ways of fixing, against the spectacle frame 1. Finally, this metal part 9A can be crimped on the latter, e.g. in the way shown in FIG. 4.

The second element of the combination is then in the shape of a base 11 of a magnetic kind, also including adequate means 13 for the fastening on a support 8.

Figure 5:
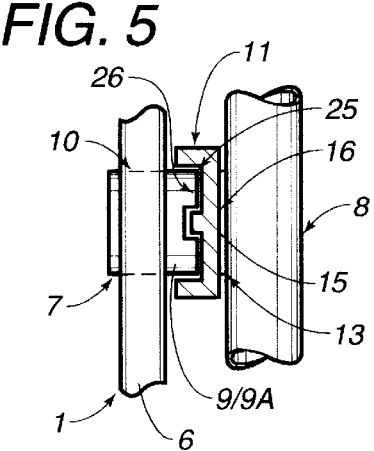
FIGS. 5 to 8 are schematic and partial views corresponding to the co-operation between a spectacle frame according to the invention and bases carried out according to various embodiments.

Such fastening means 13 can be of an adhesive kind and be in the shape of an adhesive strip 15, of a two-sided kind, applied on the back face 16 of the base 11. Such fastening means 13 are shown in FIG. 5 and can be contemplated for fixing such base 11 on a bicycle frame of aluminium, on a dashboard of a car or the like.

These fastening means 13 can also include a fastening strip 17 the velvet 18 or knop portion 19 of which is made integral with the back portion 16 of the base 11 and the knop 19 or velvet portion 18 of which is located on the support 8. The latter case occurs more in particular with a textile material, a garment 20, and has been shown in FIG. 6.

Figure 7:
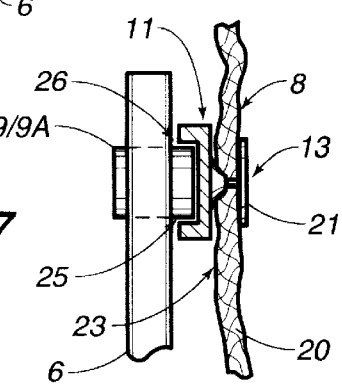

In a similar application, the fastening means 13 can also be in the shape of a nail button 21, as shown in FIG. 7, or have one or several openings 22 authorizing a connection, through sewing, with the garment 20. Such openings 22 have been schematically shown in FIG. 8.

Figure 6:
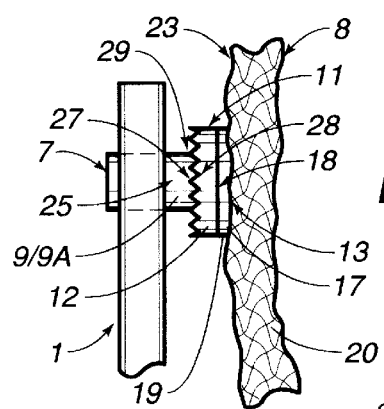
Figure 8:
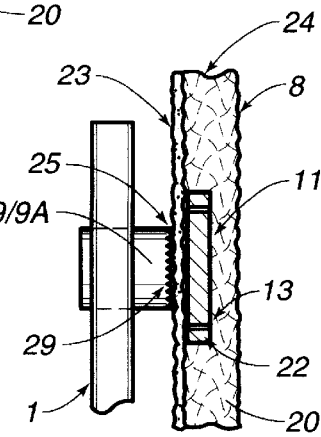

As shown in FIGS. 6 and 7, the installation of the base 11 because of the fastening means 13 can occur on the outer side 23 of the garment 20. However, for aesthetical reasons, such a base 11 can also be placed in the lining 24 of this garment 20, eventually before being made integral with it through adequate means, because of any of the above-described fastening means 13. Such an embodiment is shown in FIG. 8.

According to a feature of the invention, to the fixing means 7 of a magnetic kind are associated positioning means 25, in particular, for limiting the sliding of the spectacle frame with respect to a support 8 or to a base 11 inserted against the latter. These positioning means 25 preferably have said magnet 9 and/or said metal part 9A and/or the base 11 and/or the support 8 with complementary shapes allowing them to fit and/or to imbricate into each other.

To this end, said base 11 can include a recess 26 adjusted to receive the magnet 9 (or the metal part 9A), as shown in FIGS. 5 and 7.

According to another embodiment, on at least one of the surfaces 27, 28 in front of the base 11 or of the magnet 9 (or the metal part 9A), respectively, as shown in FIG. 6, are provided for groves 29, notches, points, bosses or the like.

One should note that particularly efficient results are achieved when on each of the surfaces 27, 28 of the base 11 and of the magnet 9 (or the metal part 9A) are simultaneously provided with groves 29, notches, points, bosses or the like, which will preferably be of a conjugated shape allowing, as a matter of fact, their imbrication.

In addition, in the case shown in FIG. 8, the provision of such groves 29, notches, points, bosses or the like on the surface 28 of the magnet 9 (or the metal part 9A) contributes to a better hooking-in of the frame 1 on a support 8, such as a garment 20, integrating a base 11 into its lining 24.

Finally, one should note that the magnet or magnets 9 or the metal part 9A will be arranged at the level of the frame or frames 2, 2' of the spectacle frame 1 or even at the level of one of the sides 6, at a location chosen so as to be capable of a co-operating, as the case may be, with any support whatsoever 8 or with a base 11, such as when the sides are folded back.

Thus, the present invention allows, when one temporarily takes off one's spectacles, to keep them within hand reach and so that they are easily accessible. Such a aim is reached by bringing the spectacles into co-operation with any support whatsoever through fixing means authorizing a quick and effective connection. The use of such means advantageously allows to substantially reduce the risk of dropping and thus of losing or breaking these spectacles.

Accordingly, the present invention represents a considerable progress in the technical field involved.

What is claimed is:

1. An apparatus comprising:
    a spectacle frame having two eyeglass frames, each of said eyeglass frames having a stud extending outwardly therefrom, said spectacle frame having a side hingedly connected to said stud;
    at least one magnet affixed to said side of said spectacle frame; and
    a support article having magnetic means thereon, said magnetic means for temporarily magnetically fixing said spectacle frame on said support article during periods of non-use of said spectacle frame.

2. The apparatus of claim 1, said magnet being moulded into said spectacle frame.

3. The apparatus of claim 1, said magnet being adhesively secured to said spectacle frame.

4. The apparatus of claim 1, said spectacle frame having a hole formed therein, said magnet being affixed within said hole.

5. The apparatus of claim 1, said magnet being crimped onto said side of said spectacle frame.

6. The apparatus of claim 1, said magnetic means comprising a plate affixed to said support article.

7. The apparatus of claim 1 further comprising:
    a positioning means connected to said magnetic means, said positioning means for limiting relative sliding movement between said spectacle frame and said support article.

* * * * *